Aug. 30, 1966 G. T. BARTA 3,270,218
FLUXMETER-GALVANOMETER CALIBRATION TEST DEVICE
Filed Aug. 27, 1963
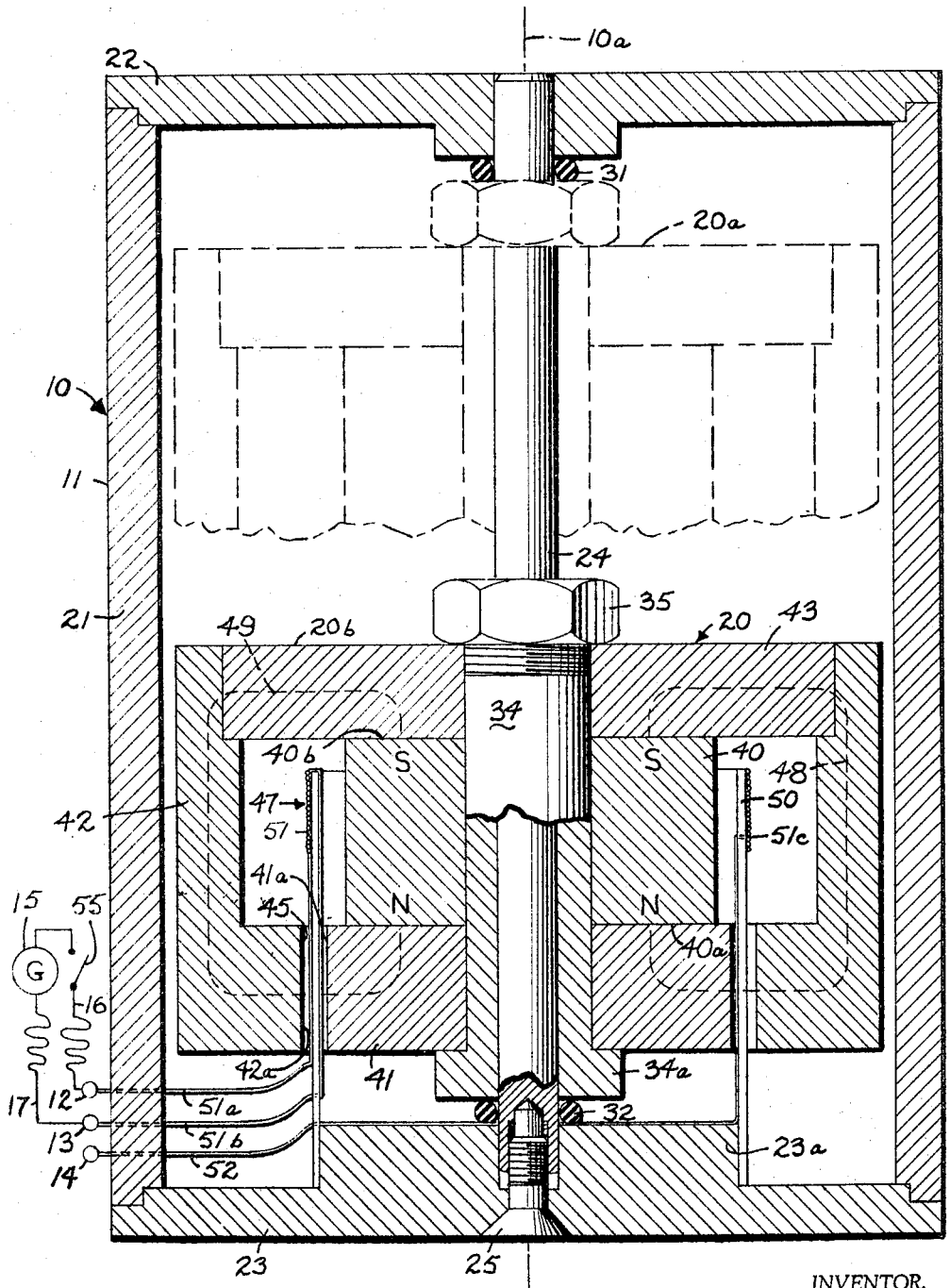
INVENTOR.
GERALD T. BARTA

United States Patent Office 3,270,218
Patented August 30, 1966

3,270,218
FLUXMETER-GALVANOMETER CALIBRATION TEST DEVICE
Gerald T. Barta, Valparaiso, Ind., assignor to Indiana General Corporation, Valparaiso, Ind., a corporation of Indiana
Filed Aug. 27, 1963, Ser. No. 304,876
12 Claims. (Cl. 310—14)

This invention relates to a calibration device for generating a predetermined voltage and particularly to such a device for use in periodically testing the calibration of galvanometers, flux meters and the like.

It is an object of the present invention to provide a calibration device which is compact and of unique simplicity in structure and operation.

It is another object of the invention to provide a calibration device which is shielded to avoid spurious readings as a result of external magnetic fields.

A feature of the invention resides in the provision of a device which is operated by successively changing the orientation thereof with respect to the earth's gravitational field, the gravitational field providing the sole motive force for moving one of the parts relative to another in generating the calibration voltage.

A further feature of the invention resides in the provision of a calibration device which is enclosed in a magnetic housing and wherein all of the moving parts of the apparatus are entirely within the housing.

Other objects, features and advantages of the present invention will be apparent from the following detailed description taken in connection with the accompanying drawings, in which:

The single figure is a somewhat diagrammatic vertical sectional view of a preferred embodiment of calibration device in accordance with the present invention.

Flux meters and galvanometers should be frequently tested for accuracy of calibration. In the past this has been done using calibrated coils, standard mutual inductance methods and the like.

The present invention is directed to a calibrator which has a standard stable pre-calibrated source of flux lines which will produce a predetermined reading on a flux meter or galvanometer or the like. By way of example, the illustrated unit 10 has been shown as comprising a housing 11 of magnetic material having respective insulated electrical terminals 12, 13 and 14 for providing calibrated voltages of predetermined values for use in calibrating conventional flux meters and galvanometers. A galvanometer 15 has been indicated as being connected between terminals 12 and 13 by means of suitable lengthy conductors diagrammatically indicated at 16 and 17. In operation the unit 10 is successively inverted so as to move a magnetic circuit means 20 between a position shown in dot-dash outline at 20a and a solid outline position such as indicated at 20b. The conductors 16 and 17 have been indicated as being relatively lengthy so as to permit the successive inversion of the unit 10. It is, of course, not necessary to completely invert the unit 10 so long as the longitudinal axis of the unit indicated at 10a is at least inclined relative to the horizontal first in one sense and then in an opposite sense. For example, to operate the device, beginning with the orientation shown in the drawings, the unit 10 may be abruptly completely inverted, whereupon the inertia of the magnetic circuit means 20 will initially tend to result in the magnetic circuit means 20 remaining in its solid outline position indicated at 20b, after which the magnetic circuit means will move under the impetus of gravity downwardly to the position indicated in dot-dash outline at 20a (which will now be the lower position). The result of this action would be to generate a voltage of one polarity between terminals 12 and 13. If a voltage of opposite polarity were desired, the unit 10 could be first tilted to move the magnetic circuit means 20 to the position 20a, after which the unit 10 could be abruptly returned to the upright orientation shown on the drawings whereupon the magnetic circuit means would move from the position indicated at 20a to the position shown at 20b under the action of gravity.

To explain the details of construction of a preferred embodiment, the housing 11 may comprise a tubular part 21 having end members 22 and 23 secured therewith to form a substantially closed housing of magnetic shielding material. The housing has a central axially extending fixed shaft 24 having a press fit connection with end member 22. The entire housing may thus be secured in assembled relation by means of a single screw 25 threaded into the end of shaft 24 which is received by end member 23.

A pair of O-rings 31 and 32 are fixed at opposite ends of the shaft 24 within the housing for engaging the magnetic circuit means 20 at its opposite limits of travel.

The magnetic circuit means is mounted by means of a tube 34 of non-magnetic material having a flange portion at one end as indicated at 34a and threaded at the opposite end to receive a jam nut 35. The tube member 34 is provided with an inside diameter having a free sliding fit with the external diameter of shaft 24. As shown, the jam nut 35 engages ring 31 as the magnetic circuit means 20 moves to the position 20a, and the end of flange portion 34a of tube 34 engages ring 32 as the magnetic circuit means 20 moves to the position 20b as shown in solid outline on the drawings.

The magnetic circuit means 20 includes an annular permanent magnet 40, a ring 41 of magnetic material, a sleeve 42 of magnetic material and a further ring 43 of magnetic material. The permanent magnet 40 may be magnetized in the axial direction, for example with its annular end face 40a having north magnetic polarity and its annular end face 40b having south magnetic polarity. The exterior cylindrical face 41a of ring 41 has a substantially lesser diameter than the inside diameter of inner cylindrical face 42a of sleeve 42 so as to provide an annular air gap 45 therebetween. The air gap 45 has a radial dimension so as to provide clearance with a coil assembly generally designated by the reference numeral 47. The permanent magnet 40 sets up a magnetic flux such as indicated by the dash lines 48 and 49 which extends radially across the air gap 45. As the magnetic circuit means 20 moves between its limit positions indicated at 20a and 20b, the flux lines such as indicated at 48 and 49 extending radially across the air gap successively cut the turns of the coil assembly 47 so as to generate a predetermined calibration voltage in the coil.

The coil assembly 47 may comprise a suitable tube 50 of non-conductive material fitting over a reduced diameter portion 23a of end wall member 23. For example, the tube 50 may have a sufficiently close fit with the cylindrical face of reduced diameter portion 23a so as to be fixedly retained therewith.

By way of example, the tube 50 may have a single layer helical coil wound on the outside diameter thereof and formed of a wire 51 which is shown in cross section and somewhat diagrammatically on the drawings. Any suitable means may be provided for insulating the successive turns of the conductive portion of the wire 51 and for securing the successive turns in position on the tube 50. For illustrative purposes, one end of the wire 51 has been indicated at 51a and has been shown as connected with electrical terminal 12 while the opposite end of the wire has been indicated at 51b and is shown as being connected with electrical terminal 13. For the purposes of illustration, a further wire has been indicated at 52 which may be electrically connected with the conductor 51 at an intermediate point of the coil such as indicated at 51c. Thus, a relatively high voltage is generated between terminals 12 and 13, while a lesser voltage is generated between terminals 13 and 14, for example. The voltages between terminals 12 and 13 and between terminals 13 and 14 may be selected for calibrating different instruments, for example. Of course, further points along the coils formed by conductor 51 may be tapped so as to provide any number of voltage values between the various terminals such as indicated at 12–14.

Summary of operation

In placing the unit in operation, the correct terminals 12–14 for providing the desired calibrating voltage are selected and connected by means of leads 16 and 17 to the instrument whose calibration is to be checked such as galvanometer 15. The unit 10 is then manually abruptly inverted so that the magnetic circuit means 20 moves from its initial position to the position indicated in dot dash outline at 20a (then the lower position under the impetus of gravity. As the magnetic circuit means 20 moves in this manner, the flux line such as indicated at 48 and 49 cut the successive turns of coil assembly 47 generating the desired calibration voltage between terminals 12 and 13, for example. If a calibration voltage of opposite polarity is desired, the unit 10 is again inverted to return the unit to the orientation shown on the drawings with the magnetic circuit means 20 moving from the position indicated in dot dash outline at 20a to the position shown in solid outline at 20b.

The rate of movement of the magnetic circuit 20 is determined by the mechanical construction of the device under the substantially constant influence of gravitational acceleration, so that the time in which the calibration voltage is generated will be substantially constant so long as the unit 10 is manipulated so that the magnetic circuit means is accelerated while the axis 10a of the unit is vertical.

A switch 55 may be provided if desired in the calibration circuit so that the galvanometer 15 may be permanently associated with the calibration unit 10, and the switch 55 opened when it is desired to utilize the galvanometer 15 for measurement purposes. It will be observed that the housing 11 completely encloses the coil assembly 47 so as to shield the coil assembly from external magnetic fields. There are no moving parts extending into the housing since the moving part which is the illustrated embodiment is the magnetic circuit means 20 is actuated solely by gravity.

By way of a specific example and not of limitation, the housing may have an inside diameter of three inches while the magnetic circuit means may have an outside diameter of two and ⅞ inches. This provides an annular passage having a radial dimension of 1/16 inch to allow displacement of air from one side of the magnetic circuit means to the opposite side as the magnetic circuit means is impelled by the action of gravity in generating a calibrating voltage. Further, by way of example and not of limitation, the tube mounting the coil assembly may have a radial wall thickness of 1/16 inch where the annular air gap has a radial dimension of ⅛ inch with an inside diameter of 1⅝ inches and an outisde diameter of 1⅞ inches. The tube mounting the electric coil may be exactly centered with respect to the radial dimension within the annular air gap, for example.

The coil assembly 47 preferably has a coil of limited axial extent as shown in the drawings so that the coil is substantially spaced from the magnetic field at air gap 45 of the magnetic circuit means 20 in the limit positions thereof indicated at 20a and 20b. By this arrangement the number of lines of magnetic flux which will cut the coil will be always the same. With a coil which extended for the full length of tube 50, accurate adjustment of the various parts of the device would be required to keep the total number of lines of flux cut by all the turns of the coil constant. With a coil of limited axial extent as shown the adjustment is not critical. The calibration voltage output will be repeatable and stable since small movements of the magnetic circuit means at the limit positions 20a and 20b will not cause lines of magnetic flux to cut the turns of the coil.

In practice it would be normal to permanently install the calibrator in series with a search coil and the actuating coil of a galvanometer so that the calibration of the galvanometer could be conveniently checked by means of the calibrator at frequent intervals.

As an example of a modification of the illustrated embodiment which may be made, the magnetic circuit 20 may be fixed in position 20a and the coil assembly 47 mounted on shaft 24 for movement between two limit positions, one with the coil outside of and spaced from the magnetic circuit and the other with the coil within the magnetic circuit in the relative position shown in the drawing.

While shaft 24 is described as having a press fit connection with end member 22, other connecting means may be employed such as a threaded connection. Similarly member 35 could have a jam fit with tube 34 instead of a threaded connection. The shaft 24 could be of magnetic material (i.e. ferromagnetic material) but it is preferably of non-magnetic material.

The magnetic circuit means 20 is self shielded by ferromagnetic parts 41, 42 and 43 in addition to the shielding provided by ferromagnetic housing 11.

It will be apparent that many modifications and variations may be effected without departing from the scope of the novel concepts of the present invention.

I claim as my invention:

1. A calibration device comprising a housing, magnetic circuit means disposed in said housing for movement between first and second positions, said magnetic circuit means comprising a permanent magnet for establishing a magnetic field, and a winding disposed in said housing for coupling with the magnetic field of said magnetic circuit means with movement of said magnetic circuit means between said first and second positions inducing a predetermined calibration voltage in said winding, said magnetic circuit means being movable between said first and second positions solely by the action of gravity in response to successive inversions of said housing, and said magnetic field being out of flux cutting relation with said winding when said magnetic circuit means is at said first and second positions.

2. A calibration device comprising a housing, magnetic circuit means disposed in said housing for movement between first and second positions, said magnetic circuit means comprising a permanent magnet for establishing a magnetic field, and a winding disposed in said housing for coupling with the magnetic field of said magnetic circuit means with movement of said magnetic circuit means between said first and second positions inducing a predetermined calibration voltage in said winding, said magnetic circuit means being movable between said first and second positions solely by the action of gravity in response to successive inversions of said housing, said magnetic field being out of flux cutting relation with said winding when said magnetic circuit means is at said first and second positions, and said housing being of magnetic material and substantially completely enclosing said magnetic circuit means to shield said winding from external magnetic fields.

3. A calibration device comprising a housing, magnetic circuit means disposed in said housing for movement between first and second positions, said magnetic circuit means comprising a permanent magnet for establishing a magnetic field, and a winding disposed in said housing for coupling with the magnetic field of said magnetic circuit means with movement of said magnetic circuit means between said first and second positions inducing a predetermined calibration voltage in said winding, said magnetic circuit means being movable between said first and second positions solely by the action of gravity in response to successive inversions of said housing, said magnetic circuit means comprising a magnetic core having an annular air gap with said permanent magnet producing said magnetic field across said gap, said winding comprising a coil and coil form of annular configuration corresponding in diameter to the diameter of said annular air gap, said magnetic circuit means in said first position thereof receiving said coil form in said annular air gap of said magnetic core, and said coil being substantially spaced in its entirety from the annular air gap when said magnetic circuit means is in said first and second positions.

4. A calibration device comprising a housing adapted for successive inversions, each inversion generating a predetermined calibration voltage, an electric winding in said housing, magnetic circuit means comprising a permanent magnet producing a magnetic field for coupling with said winding, means including said housing for mounting said winding and magnetic circuit means for relative movement between first and second relative positions by the action of gravity in response to successive inversions of said housing, and the relative movement of said winding and magnetic circuit means between said relative positions producing said predetermined calibration voltage in said winding.

5. A calibration device comprising a cylindrical housing of magnetic material, an electric coil of annular configuration having its axis coinciding with the axis of said housing, said coil being secured in place at one axial end of said housing, a magnetic core of cylindrical configuration having its axis coinciding with the axis of said housing and slidably mounted in said housing for movement from a first position adjacent the opposite axial end of said housing to a second position adjacent said one axial end of said housing, said magnetic core having an annular air gap at the side thereof proximate said one axial end of said housing and of diameter to receive said electric coil as said magnetic core moves from said first position to said second position, and said magnetic core having a permanent magnet producing a magnetic field directed radially across said annular air gap for inducing a predetermined calibration voltage as said core moves between said first and second positions.

6. A calibration device comprising a cylindrical housing of magnetic material, an electric coil of annular configuration having its axis coinciding with the axis of said housing, said coil being secured in place at one axial end of said housing, a magnetic core of cylindrical configuration having its axis coinciding with the axis of said housing and slidably mounted in said housing for movement from a first position adjacent the opposite axial end of said housing to a second position adjacent said one axial end of said housing, said magnetic core having an annular air gap at the side thereof proximate said one axial end of said housing and of diameter to receive said electric coil as said magnetic core moves from said first position to said second position, and said magnetic core having a permanent magnet producing a magnetic field directed radially across said annular air gap for inducing a predetermined calibration voltage as said core moves between said first and second positions, said magnetic core being movable between said first and second positions under the action of gravity in response to successive inversions of the housing.

7. A calibration device comprising a housing having an electric coil member and a permanent magnet member mounted therein for relative movement between first and second positions, one of the members being movable solely under the impetus of gravity along a path of movement between the first position and the second position, and said permanent magnet member being magnetized to produce a predetermined magnetic flux interlinkage with the coil member and thus to produce a predetermined voltage across the coil member in response to movement of the one member from said first position to said second position, said permanent magnet member and said coil member being out of flux cutting relation when said one member is in said first and second positions.

8. A calibration device comprising a permanent magnet member producing a magnetic field and a coil member mounted for relative movement by gravity along a path of movement with the magnetic field generating a predetermined voltage upon relative movement of the members from a first relative position to a second relative position along said path, guide means for guiding one of the members for movement relative to the other of said members along said path of movement under the impetus of gravity from the first relative position to the second relative position, the other of said members being fixed relative to said guide means, the guide means being invertible a first time to place the one movable member in the first relative position and being invertible a second time to produce the movement of the one of said members from the first relative position to the second relative position along said guide means, and said coil member being spaced from said magnetic field when said one movable member is in said first and second relative positions.

9. A calibration device comprising a housing, an electric winding in said housing, magnetic circuit means comprising a permanent magnet producing a magnetic field for coupling with said winding, means including said housing for mounting said winding and magnetic circuit means for relative movement between first and second relative positions by the action of gravity in response to successive inversions of said housing, and the relative movement of said winding and magnetic circuit means between said first and second relative positions producing a predetermined calibration voltage in said winding, said electric winding being substantially spaced in its entirety from the magnetic field of said magnetic circuit means in said first and second relative positions of said winding and magnetic circuit means.

10. A calibration device comprising a permanent magnet member producing a magnetic field and a coil member mounted for relative movement by gravity along a path of movement with the magnetic field generating a predetermined voltage upon relative movement of the members from a first relative position to a second relative position along said path, guide means for guiding one of the members for movement relative to the other of said members along said path of movement under the impetus of gravity from the first relative position to the second relative position, the other of said members being fixed relative to said guide means, and the guide means being invertible a first time to place the one movable member in the first relative position and being invertible a second time to produce the movement of the one of said members from the first relative position to the second relative position along said guide means, said one of said members having a free sliding fit with said guide means, and said coil member being spaced from said magnetic field when said one movable member is in said first and second relative positions.

11. A calibration device comprising a cylindrical housing of magnetic material, an electric coil of annular configuration having its axis coinciding with the axis of said housing, said coil being secured in place at one axial end of said housing, a magnetic core of cylindrical configuration having its axis coinciding with the axis of said housing and slidably mounted in said housing for movement from a first position adjacent the opposite axial end of said housing to a second position adjacent said one axial end of said housing, said magnetic core having an annular air gap at the side thereof proximate said one axial end of said housing and of diameter to receive said electric coil as said magnetic core moves from said first position to said second position, and said magnetic core having a permanent magnet producing a magnetic field directed radially across said annular air gap for inducing a predetermined calibration voltage as said core moves between said first and second positions, said magnetic core providing ferromagnetic material substantially completely surrounding said permanent magnet.

12. A calibration device comprising a housing adapted for successive inversions, each inversion generating a predetermined calibration voltage, an electric winding in said housing, magnetic circuit means in said housing comprising a permanent magnet producing a magnetic field for coupling with means including said housing for mounting said winding, said winding and magnetic circuit means for relative movement between first and second relative positions by the action of gravity in response to successive inversions of said housing, and the relative movement of said winding and magnetic circuit means between said relative positions producing said predetermined calibration voltage in said winding, said magnetic circuit means providing ferromagnetic material substantially completely surrounding said winding in said second relative position of said winding and magnetic circuit.

References Cited by the Examiner

UNITED STATES PATENTS

| | | | |
|---|---|---|---|
| 266,244 | 10/1882 | Weston | 324—145 |
| 2,479,699 | 8/1949 | Powell | 324—32 X |
| 2,740,946 | 4/1956 | Geneslay | 310—25 X |
| 2,756,406 | 7/1956 | Schurman | 310—15 X |
| 2,842,688 | 7/1958 | Martin | 310—15 |
| 3,024,374 | 3/1962 | Stauder | 310—4 X |
| 3,105,153 | 9/1963 | James | 310—15 |
| 3,129,347 | 4/1964 | Tognola | 310—15 |
| 3,153,735 | 10/1964 | Branagan et al. | 310—15 |
| 3,153,757 | 10/1964 | Bolton | 324—51 |

OTHER REFERENCES

Thompson, S. P., Elementary Lessons in Electricity and Magnetism, page 211, FIG. 129; The Macmillian Company, London, 1912.

MILTON O. HIRSHFIELD, *Primary Examiner.*

ORIS L. RADER, *Examiner.*

C. W. DAWSON, D. F. DUGGAN,
*Assistant Examiners.*